(12) United States Patent
Bowyer

(10) Patent No.: US 6,626,083 B2
(45) Date of Patent: Sep. 30, 2003

(54) SPRING BRAKE ACTUATOR WITH HOT SET SPRING

(75) Inventor: John P. Bowyer, Whitehall, MI (US)

(73) Assignee: Haldex Brake Corporation, Kansas City, MO (US)

(*) Notice: Subject to any disclaimer, the term of this patent is extended or adjusted under 35 U.S.C. 154(b) by 0 days.

(21) Appl. No.: 09/825,428

(22) Filed: Apr. 3, 2001

(65) Prior Publication Data

US 2002/0139242 A1 Oct. 3, 2002

(51) Int. Cl.[7] ............................................. F15B 21/04
(52) U.S. Cl. .................................................. 92/63; 92/99
(58) Field of Search ............................. 92/63, 64, 103 R, 92/103 SD, 99

(56) References Cited

U.S. PATENT DOCUMENTS

| | | | | |
|---|---|---|---|---|
| 5,105,727 A | * | 4/1992 | Bowyer | 92/63 |
| 5,799,564 A | * | 9/1998 | Pierce | 92/63 |
| 6,029,447 A | * | 2/2000 | Stojic et al. | 92/63 |
| 6,367,433 B2 | * | 4/2002 | Oyama et al. | 123/90.11 |

OTHER PUBLICATIONS

NTIS—Northern Light Technology Inc., *Heat Setting Procedures for Helical Coiled Springs*, ©1997–2000, 4 Pages, http://library.northernlight.com.

Preston Marshall, *Suspension Tuning*, Mar. 2, 2000, pp. 1–5, http://www.gnttype.org/techarea/suspension/suspension.html, Mar. 2, 2000.

Lee Spring Company, *Glossary of Spring Terminology*, pp. 1–4, http//www.leespring.com/terminology.html, Feb. 10, 2000.

General Wire Spring Company, *Glossary*, pp. 1–5, http://www.generalwirespring.com/springs/glossary.html, Mar. 2, 2000.

* cited by examiner

Primary Examiner—Edward K. Look
Assistant Examiner—Thomas E. Lazo
(74) Attorney, Agent, or Firm—St. Onge Steward Johnston & Reens, LLC

(57) ABSTRACT

A spring brake actuator has a sealed spring chamber with a hot set large force compression spring. An alternative embodiment has the hot set spring guided by the actuator rod.

5 Claims, 3 Drawing Sheets

SPRING BRAKE ACTUATOR WITH HOT SET SPRING

BACKGROUND OF THE INVENTION

1. Field of the Invention

The invention relates to air-operated diaphragm brake actuators for vehicles and particularly to spring brake actuator assemblies and the springs used therein.

2. State of the Prior Art

An air brake system for a vehicle such as a bus, truck or the like typically includes a brake shoe and drum assembly that is actuated by means of an actuator assembly operated by the selective application of compressed air. Conventional air brake actuators have both a service brake actuator for actuating the brakes under normal driving conditions by the application of compressed air and a spring-type emergency brake actuator which causes actuation of the brakes when air pressure has been released. The emergency brake actuator includes a strong compression spring which forces application of the brake when air is released. This is often referred to as the spring brake.

Typically, the spring brake actuator is disposed in tandem with the service brake actuator. When full pressure is applied to the spring brake actuator, air pressure acting against a diaphragm compresses the compression spring. A spring brake actuator rod is held in a retracted position by a relatively small return spring, thus not affecting the operation of the brake. When the brake is to be applied during normal driving operation, compressed air is provided to the service brake actuator which, acting against a diaphragm, causes a service brake push rod to be extended and causes the brakes to be applied with an application force which is proportional to the air pressure applied to the service brake actuator. In the event of a loss of air pressure or an intentional exhaustion of air from the spring brake actuator, the brake will be mechanically activated by the force of the compression spring acting on the spring brake actuator rod which in turn acts upon the service brake push rod to apply the brakes. Thus, the spring brake portion serves both as a parking brake and an emergency brake.

In a typical prior art air brake system, the spring brake actuator and the service brake actuator are disposed in a single housing comprising a spring brake portion and a service brake portion. The service brake portion includes an air chamber partially defined by a flexible service diaphragm acting against a service brake push rod and a return spring to assure proper release of the brake when air is exhausted from the air chamber. The spring brake portion includes a spring chamber and an air chamber, both partially defined by a spring brake diaphragm acting against a spring pressure plate to compress the compression spring in the spring chamber when air pressure is applied to the spring brake diaphragm in the air chamber. An actuating rod extends through the spring brake diaphragm to integrally connect with the pressure plate. In operation, it is pushed outwardly from the air chamber through a housing opening and bearing provided with a pneumatic seal to engage the service diaphragm and push rod of the service brake, thereby causing the brake to be applied. The spring brake diaphragm is provided with a centrally disposed aperture having an annular edge and the actuator rod extends through the opening and engages the annular edge to form an airtight seal. The actuator rod is hollow with a central bore and a brake releasing caging bolt extends into the central bore. An end plate on the bolt engages the spring brake pressure plate to draw the spring to a compressed state when the spring is caged by rotation of the bolt.

The spring used in the spring chamber is typically a large force compression spring. The size of the spring depends upon the size of the actuator, but each has a certain represented force curve over the length of stroke. An example of a typical force curve is shown in FIG. 3.

The large force compression spring in an air-operated diaphragm spring brake actuator is under severe compression at all times. For example, in a 30–30 brake actuator, the spring (having an unreleased length of about 8–8½ inches) is held under compression to a length of about 1½ inches when the spring brake actuator is retracted. Normal stroke length of the brake actuator is about 1–1½ inches, so even when the spring is extended, it remains compressed at a maximum length of about 3½ inches. Because of these high internal stresses in the spring, the large force compression springs are typically cold formed at ambient temperature, heat treated, and then subsequently set after cooling (cold set springs). One problem that is commonly associated with cold set springs is that load loss in the spring over time increases, typically to a range of between 10% and 18%.

Heat setting, also known as hot pressing, is a known process for setting a spring at elevated temperature in order to minimize loss of load at operating temperature. One trade-off, however, is that a hot set spring will maintain higher internal stresses for a longer period. Consequently, hot set springs typically lack the durability of cold set springs. It is also known to use hot set springs in motor vehicle suspensions. But suspension springs are not normally under load sufficient to aggravate the normal stresses of a hot set spring, and durability is thus not normally an issue.

There is a desire to make spring brake actuators last longer, but the spring relaxation rates of cold set springs are becoming a significant issue. There is a need to reduce load loss over time in the large force compression spring of a spring brake actuator.

SUMMARY OF THE INVENTION

A spring brake actuator according to the present invention addresses the problem of load loss by incorporating a hot set large force compression spring into the actuator while at the same time protecting the spring.

The invention finds itself in an improvement in a brake actuator for a vehicle of the type comprising an enclosed housing with a diaphragm disposed in the housing and dividing the interior into a first chamber and a second chamber, the diaphragm is reciprocally movable in response to the delivery and exhaust of pressurized fluid to and from the first chamber. An actuator rod in the first chamber is movable with the diaphragm to operate a brake. A spring is disposed in the second chamber to urge the diaphragm to a first position where the first chamber is collapsed with the exhaust of pressurized fluid.

In one aspect of the invention, the improvement is having the second chamber sealed and the spring hot set. Preferably, the second chamber has filtered vent openings, although it is within the invention to have the second chamber completely sealed. In another aspect of the invention, the spring is hot set, and the axial motion of the spring is guided to minimize coil clash. In this aspect, the spring is fixed to the diaphragm and the motion of the actuator guides the spring.

DETAILED DESCRIPTION

Figure 1:
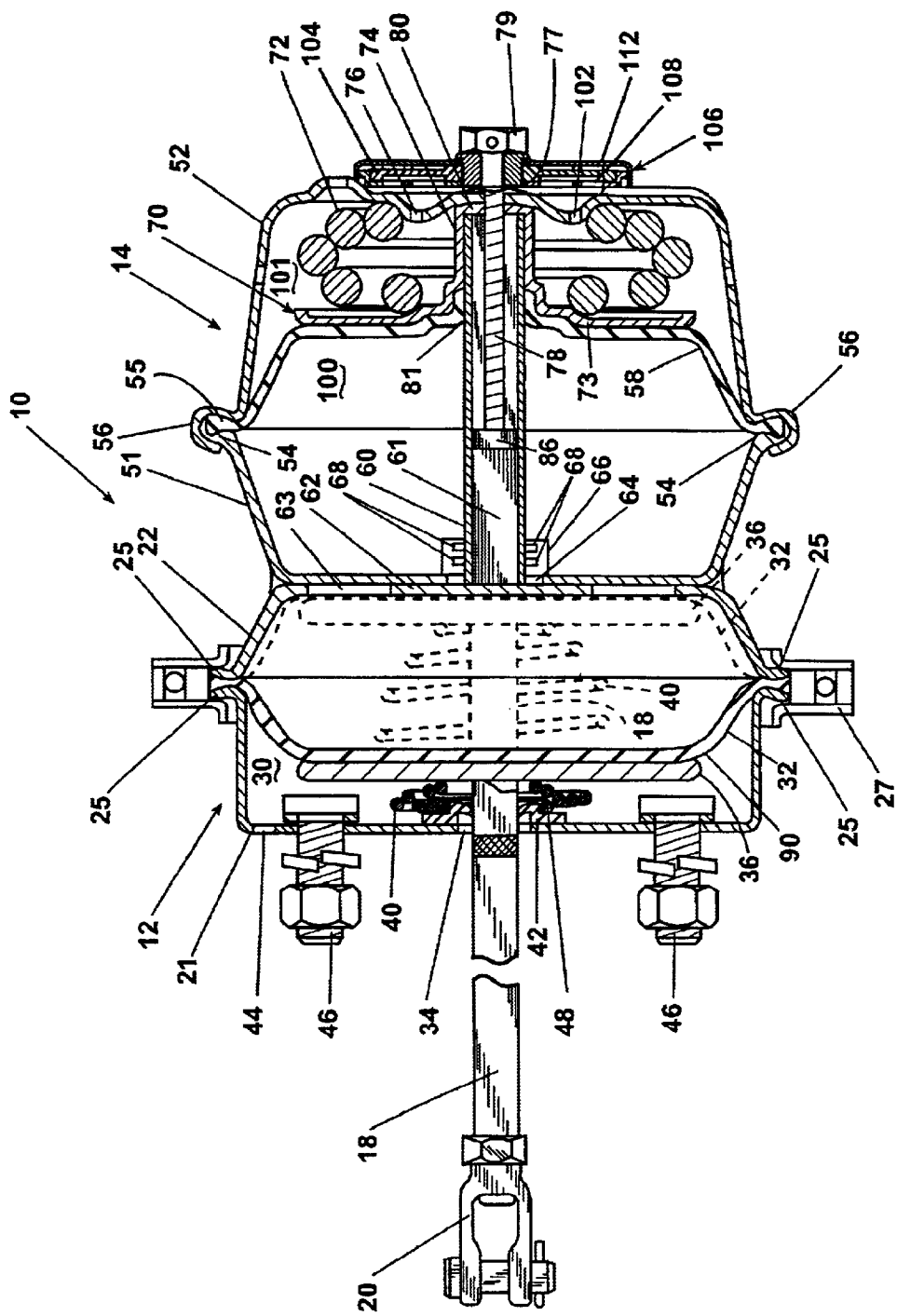
FIG. 1 is a cross-sectional view of a spring brake actuator according to the invention.

FIG. 1 shows a cross-sectional view of an air-operated brake-actuating unit 10 having a general configuration well known in the art. The actuating unit 10 comprises a service brake portion 12 mounted in tandem to a spring brake or emergency brake portion 14. A service brake push rod 18 extends from the service brake 12 and is adapted to operably connect to a conventional brake shoe and drum (not shown in the drawing) in a standard fashion. Reciprocating motion of the push rod 18 will cause the brake to be alternately applied and released.

The service brake 12 comprises a pair of facing cup-shaped housing sections 21 and 22, each having an outwardly directed flange edge 25. The housing sections 21, 22 are clamped together at their flange edges by means of a clamp 27 to form a service brake inner chamber 30. An elastomeric diaphragm 32 is suspended within the inner chamber 30 and is compressed at the peripheral edge thereof between flange edges 25 of the housing sections 21, 22. The service brake push rod 18 extends through a central opening 34 in housing section 21 and into the service brake chamber 30 where it terminates in a pressure plate 36. A return spring 40 extends between the pressure plate 36 and the interior surface of the housing section 21. A push rod guide 42 is disposed around the central opening 34 and has a spring seat 48 which receives one end of the compression spring 40 to retain it in position around the opening 34. The spring 40 thus tends to urge the pressure plate 36 and the service brake push rod 18 to a fully retracted position shown in FIG. 1.

To operate the service brake, compressed air is introduced through an air service port in housing section 22 (not shown in the drawing) to force the diaphragm 32 and the pressure plate 36 against the force of the spring 40 to actuate the push rod 18. Opening 44 are provided in the housing section 21 to permit the rapid evacuation of air from the inner chamber 30 as the brake is actuated. Mounting studs 46 are provided to mount the brake actuating unit 10 onto a vehicle.

The spring brake 14 comprises a pair of facing cup-shaped housing sections 51, 52 joined at their edges to form an inner chamber. Typically, housing sections 22, 51 are formed of an integral cast piece. Housing section 51 is provided with an outwardly directed circumferential flange edge 54. The housing sections 51 and 52 are clamped together by means of a peripheral curved edge 56 on housing section 52 engaging edge 54 on housing section 51. An elastomeric diaphragm 58 is suspended within the inner chamber and is compressed at its peripheral edge between the edges 54, 56 of the housing sections 51, 52. The portion of the inner chamber between the diaphragm 58 and the housing section 51 forms an air chamber 100 which is filled with compressed air typically supplied through an air service port in housing section 51 (not shown in the drawing) when the emergency brake is in its normal, released position. The portion of inner chamber between the diaphragm 58 and housing section 52 defines a compression spring chamber 101, containing a large-force spring brake compression spring 72.

An actuator rod 60, aligned with the push rod 18, has a distal end extending through a central opening 64 in an end wall of housing section 51. The distal end of actuator rod 60 terminates in a reaction plate 62 disposed in an annular seat 63 in an end wall of housing section 22. The opening 64 is provided with a bearing 66 having at least one annular recess which accommodates at least one O-ring seal 68. The bearing 66 defines a bearing surface for actuator rod 60, and the O-ring 68 seals the pressure chamber in the service brake 12 from the air chamber 100 in the spring brake 14. The proximal end of the actuator rod 60 extends through a centrally disposed aperture 81 in the diaphragm 58 and terminates in a pressure plate 70 which engages the spring brake compression spring 72. The pressure plate 70 comprises a substantially flat portion 73 engaging one end of the spring 72 and a tubular portion 74 extending generally axially along the axis of the spring 72. The tubular portion 74 is press-fit onto an end portion of the actuator rod 60 such that the pressure plate 70 and the actuator rod 60 form an integral unit. An annular recess 76 in an end wall of the housing section 52 serves as a seat for the spring 72 and also provides rigidity to the end wall against the force of the spring 72.

During normal operation of the brake actuator 10, the actuator rod 60 will be in the fully retracted position, as depicted in FIG. 1, by means of compressed air which is maintained in the air chamber 100. When the compressed air is exhausted, the compression spring 72 forces the pressure plate 70 and the rod 60, integrally attached to the pressure plate, in the direction of the brake push rod 18 of the service brake 12. The force of the spring 72, when released, causes the actuator rod 60 to be extended through the central opening 64 which, in turn, causes the reaction plate 62 to apply a force to the diaphragm 32 and the pressure plate 36 of the service brake 12. This action causes the service brake push rod 18 to be actuated and the brake to be applied. When the emergency brake is to be released, compressed air is once again introduced into the air chamber 100. The force of the compressed air against the diaphragm 58 urges the pressure plate 70, the rod 60, and the spring 72 toward the retracted position depicted in FIG. 1.

The actuator rod 60 preferably is a hollow tube or rod provided with a central bore 61 to accommodate a brake release caging rod or tool 78. The distal end is closed by the reaction plate 62, but the proximal end is open, and an aperture is provided in the pressure plate 70 to permit the caging rod 78 to extend therethrough. The caging rod 78 is used to manually release the spring brake or to ensure that the compression spring 72 will remain compressed (or caged) when maintenance functions are performed on the brake assembly. The caging rod 78 preferably is a bolt or the like threaded into a fixed threaded opening, such as, for example, the threaded collar 77 affixed by welding to the end wall of housing section 52. A hex-head nut 79 is fixedly attached to the caging rod 78 to facilitate threading the bolt into and out of the chamber 14 by a common wrench or the like. The end of the caging rod 78 within the actuator rod 60 has an enlarged head or plate 86.

An inwardly directed annular shoulder 80 in the tubular section 74 provides positive engagement with the actuator rod 60 when the rod is actuated and further serves as an engagement surface for the caging rod head 86 against which the caging rod head 86 will bear when the caging rod 78 is withdrawn. Upon withdrawal, the caging rod 78 retains the compression spring 72 in its compressed or caged state. Otherwise, the caging rod 78 extends into the central bore 61 of actuator rod 60 by a sufficient distance to allow the actuator rod 60 to extend its full length of travel without engagement between the shoulder 80 and the caging rod head 86.

FIG. 1 further shows a plurality of vent openings 102 in the annular recess of the end wall of the housing section 52. Covering the vent openings 102 is a gas permeable filter element 104. Preferably, the filter element 104 is a porous polymer membrane having hydrophobic and oleophobic properties and a pore size of about one micron. An acceptable filter element comprises a treated, expanded polytetrafluoroethylene (PTFE), available from W. L. Gore and Associates and sold under the brand name Gore-Tex®.

The filter element 104 is retained in place by a filter frame assembly 106 comprising a perforated plate 108 secured to the housing section 52. The plate 108 and the filter element 104 are covered by a shield 112, which itself has openings 114 offset from the openings 110 in the plate 108. The filter is positioned to require all of the air entering and exiting the chamber 101 to go through the filter 104. The shield protects the filter and the openings from dirt, debris, ice accumulation, paint, and the like. It will be understood that as air is drawn into the chamber 101 when the spring 72 expands, contaminants in the atmosphere will be trapped by the filter 104. Conversely, as air is expelled from the chamber 101 when the pressure plate 70 is retracted, it is forced back through the filter and will effectively clean it, expelling the contaminants into the atmosphere. Thus, the interior of the chamber 102 is maintained substantially free of contaminants, regardless of operation of the spring brake.

Figure 2:
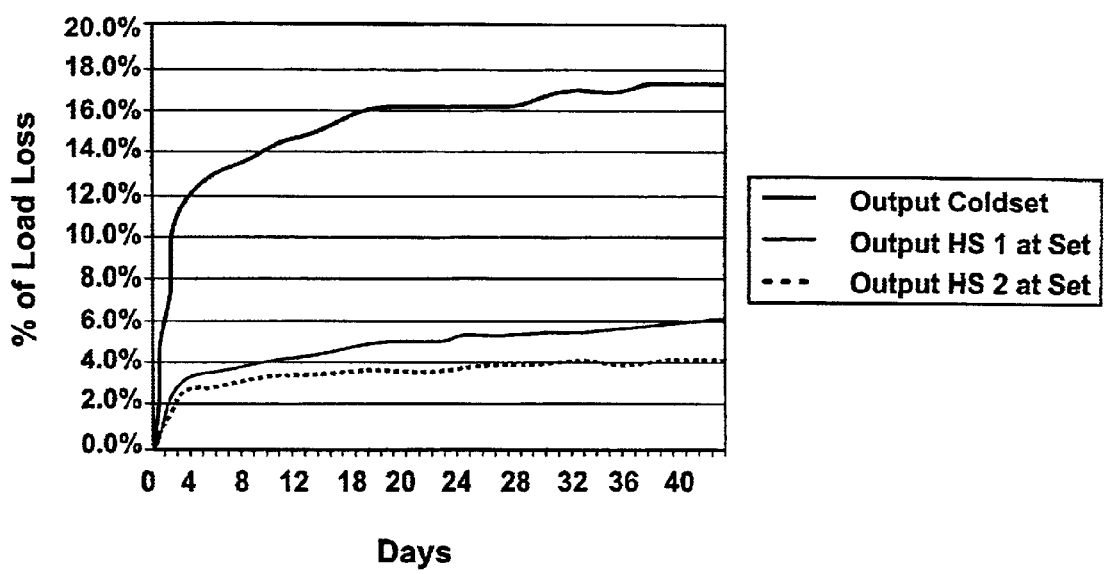
FIG. 2 is a chart showing the load loss comparison of brake actuators with prior art compression springs and those with hot set springs.
Figure 3:
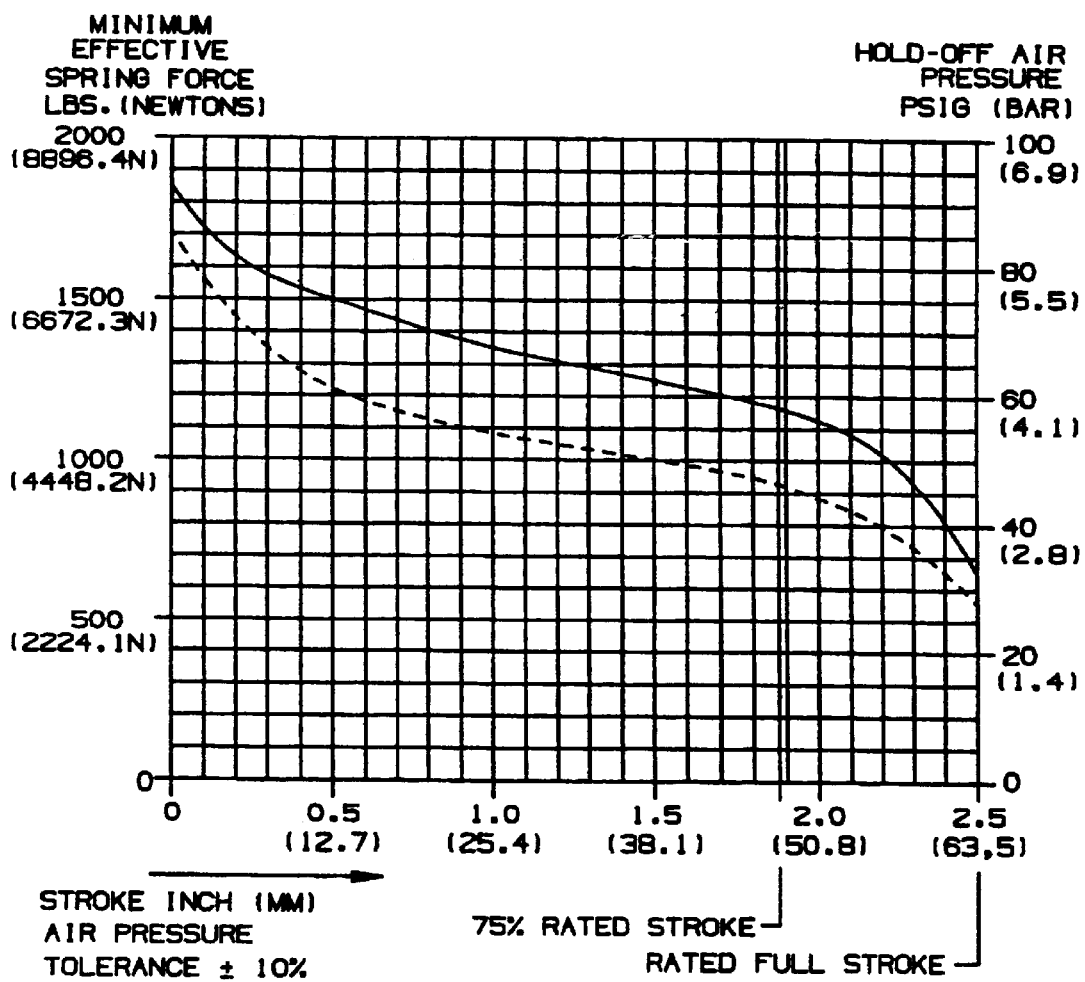
FIG. 3 is an example of a typical force curve for the spring.

Turning now to the large force compression spring 72, it will be understood that the spring is formed from a hot set process where the spring has been set at an elevated temperature. The resulting load loss comparison between three spring brake actuators, two with hot set springs and one with a cold set spring is shown in FIG. 2. In the comparison test, large force compression springs were compressed at roughly the equivalent of a 75% rated stroke (approximately 1.75 in.) in a fixture, and the compression force measured over time. The percentage change in force is plotted. It can be seen that incorporating a hot set large force compression spring will significantly reduce load loss in the spring over time.

Because of the higher internal stresses associated with a hot set spring, it becomes more important to protect the spring. This is accomplished by either protecting the environment in which the spring operates or by guiding the stroke of the spring to avoid coil clash, or preferably both. In the instant invention, it is apparent that the spring chamber 101 is sealed from exposure to ambient atmosphere outside the actuator. All air entering and exiting the chamber 101 is filtered by the filter element 104. It is also possible to completely seal the spring chamber so that all air entering or exiting the chamber comes from another area internal to the brake actuator, either through the hollow actuator rod 60, or through the diaphragm itself. An example of a differently sealed spring chamber can be found in the commonly owned U.S. Pat. No. 5,722,311 and in commonly owned U.S. Patent Re. 36,955, both of which are incorporated herein by reference. In addition, it is apparent that the actuator rod 60 also serves to guide the axial extension of the spring 72 so as to minimize coil clash and further protect the spring.

It will be understood that other variations and modifications of the foregoing embodiments may be devised by those skilled in the art without departing from the scope of the invention as defined by the appended claims.

I claim:
1. In a brake actuator for a vehicle comprising:
   an enclosed housing,
   a diaphragm disposed within the housing and dividing the interior thereof into a first chamber and a second chamber and reciprocally movable therein in response to the delivery and exhaust of pressurized fluid to and from the first chamber, respectively,
   an actuator rod in the first chamber and moveable with the diaphragm for operation of a brake, and
   a spring disposed in the second chamber in a position to urge the diaphragm to a first position wherein the first chamber is collapsed upon exhaust of pressurized fluid from the first chamber, the improvement wherein:
   the second chamber is sealed and the spring is hot set.

2. A brake actuator according to claim 1 wherein the second chamber has vent openings in communication with the exterior atmosphere and at least one filter element positioned to require all air passing through the vent openings to also pass through the filter element.

3. A brake actuator according to claim 1 wherein the second chamber is completely sealed from the exterior atmosphere.

4. In a brake actuator for a vehicle comprising:
   an enclosed housing,
   a diaphragm disposed within the housing and dividing the interior thereof into a first chamber and a second chamber and reciprocally movable therein in response to the delivery and exhaust of pressurized fluid to and from the first chamber, respectively,
   an actuator rod in the first chamber and moveable with the diaphragm for operation of a brake, and
   a spring disposed in the second chamber in a position to urge the diaphragm to a first position wherein the first chamber is collapsed upon exhaust of pressurized fluid from the first chamber, the improvement wherein:
   the spring is hot set and axial motion of the spring is guided to minimize coil clash.

5. A brake actuator according to claim 4 wherein the actuator rod is fixed to the diaphragm and motion of the actuator rod guides the spring.

* * * * *